United States Patent
Yan et al.

(10) Patent No.: US 10,078,323 B2
(45) Date of Patent: Sep. 18, 2018

(54) DYNAMICALLY CONFIGURABLE INTELLIGENT CONTROLLER AND CONTROL METHOD FOR MACHINE TOOLS BASED ON DSP/FPGA

(71) Applicants: CHONGQING UNIVERSITY, Chongqing (CN); CHONGQING HAITEKE SYSTEM INTEGRATION CO., LTD., Chongqing (CN); BEIJING TSINHUA SOFTWARE INFORMATION TECHNOLOGY CO., LTD., Beijing (CN)

(72) Inventors: Ping Yan, Chongqing (CN); Runzhong Yi, Chongqing (CN); Qingning Zhao, Beijing (CN); Fei Liu, Chongqing (CN); Linqiao Hu, Chongqing (CN)

(73) Assignees: Chongqing University, Chongqing (CN); Chongqing Haiteke System Integration Co., Ltd., Chongqing (CN); Beijing Tsinghua Software Information Technology Co., Ltd., Beijing (CN)

( * ) Notice: Subject to any disclaimer, the term of this patent is extended or adjusted under 35 U.S.C. 154(b) by 59 days.

(21) Appl. No.: 14/781,258

(22) PCT Filed: Sep. 24, 2014

(86) PCT No.: PCT/CN2014/087239
§ 371 (c)(1),
(2) Date: Sep. 29, 2015

(87) PCT Pub. No.: WO2015/106582
PCT Pub. Date: Jul. 23, 2015

(65) Prior Publication Data
US 2016/0313725 A1    Oct. 27, 2016

(30) Foreign Application Priority Data
Jan. 17, 2014 (CN) .......................... 2014 1 0021643

(51) Int. Cl.
G05B 13/02 (2006.01)
G05B 19/408 (2006.01)
G05B 19/414 (2006.01)

(52) U.S. Cl.
CPC ..... *G05B 19/4083* (2013.01); *G05B 19/4148* (2013.01); *G05B 2219/33125* (2013.01); *G05B 2219/34303* (2013.01); *Y02P 90/185* (2015.11)

(58) Field of Classification Search
CPC .......... G05B 2219/34216; G05B 2219/33154; G05B 2219/34015; G05B 2219/50218; G06F 8/447
See application file for complete search history.

(56) References Cited

U.S. PATENT DOCUMENTS 7,093,225 B2 * 8/2006 Osann, Jr. ........... G06F 17/5054
                                                                    438/129
7,103,424 B2 * 9/2006 Chandhoke ........ G05B 19/4147
                                                                    700/1
(Continued)

FOREIGN PATENT DOCUMENTS

CN         1766767 A       5/2006
CN       101221420 A       7/2008
(Continued)

OTHER PUBLICATIONS

PCT International Search Report dated Dec. 31, 2014, issued in corresponding International Application No. PCT/CN2014/087239, 3 pages.
(Continued)

*Primary Examiner* — Darrin D Dunn
(74) *Attorney, Agent, or Firm* — Finnegan, Henderson, Farabow, Garrett & Dunner LLP

(57) ABSTRACT

A dynamically configurable intelligent controller of a machine tool based on DSP/FPGA and control method thereof are disclosed. The intelligent controller includes a DSP/FPGA information processing module, a data input module, an output execution module and an embedded central processing system module. The DSP/FPGA information processing module includes a hardware reconfigurable information sampling unit, a digital signal processing unit, a hardware reconfigurable algorithm unit, a hardware reconfigurable control information output execution unit and a data storage unit. The DSP/FPGA information processing module configures hardware units according to an intelligent control strategy file created based on the intelligent control needs to generate an intelligent control algorithm graph. The intelligent controller according to the present disclosure can, based on the control needs of the machine tool, dynamically configure the input and output hardware and the algorithm hard ware, and reconfigure the I/O connection and the algorithm module to generate an intelligent control algorithm graph. The intelligent controller also can dynamically output control instructions.

4 Claims, 5 Drawing Sheets

(56) References Cited

U.S. PATENT DOCUMENTS

| | | | |
|---|---|---|---|
| 7,194,321 B2* | 3/2007 | Sun | G05B 19/4141 318/34 |
| 7,299,458 B2* | 11/2007 | Hammes | G06F 8/447 716/103 |
| 7,379,777 B2* | 5/2008 | Chandhoke | G05B 19/056 700/40 |
| 7,565,631 B1* | 7/2009 | Banerjee | G06F 17/5045 716/103 |
| 8,364,946 B2* | 1/2013 | Ishebabi | G06F 17/5054 713/100 |
| 8,688,258 B2* | 4/2014 | Miller | G05B 19/414 700/159 |
| 8,826,255 B1* | 9/2014 | Avadhanula | G06F 8/433 717/154 |
| 8,949,811 B2* | 2/2015 | Murthy | G06F 8/433 717/157 |
| 9,285,801 B2* | 3/2016 | Chandhoke | G05B 19/41845 |
| 2001/0014937 A1* | 8/2001 | Huppenthal | G06F 15/7867 712/15 |
| 2003/0009242 A1* | 1/2003 | Bocchi | G05B 19/4142 700/61 |
| 2003/0144751 A1* | 7/2003 | Chandhoke | G05B 19/042 700/61 |
| 2004/0243384 A1* | 12/2004 | Chen | G06F 17/5027 703/23 |
| 2005/0049724 A1* | 3/2005 | Chandhoke | G05B 19/4147 700/18 |
| 2005/0120323 A1* | 6/2005 | Goodnow | G06F 17/5054 716/104 |
| 2006/0100723 A1* | 5/2006 | Sun | G05B 19/4141 700/61 |
| 2009/0031106 A1* | 1/2009 | Honda | H03K 19/17728 712/29 |
| 2009/0281676 A1* | 11/2009 | Beavis | G06F 1/266 700/295 |
| 2010/0153923 A1* | 6/2010 | Kawahito | G06F 8/70 717/124 |
| 2011/0153981 A1* | 6/2011 | Yancey | G06F 15/7867 712/15 |
| 2011/0178619 A1* | 7/2011 | Jung | G05B 19/0426 700/95 |
| 2011/0231644 A1* | 9/2011 | Ishebabi | G06F 8/447 713/100 |
| 2013/0317630 A1* | 11/2013 | Schulz | H02P 23/04 700/73 |
| 2013/0345874 A1* | 12/2013 | Blumberg | B25J 9/0087 700/259 |
| 2014/0114463 A1* | 4/2014 | Shilpiekandula | G05B 19/19 700/173 |
| 2014/0380291 A1* | 12/2014 | Auerbach | G06F 8/443 717/156 |
| 2015/0005937 A1* | 1/2015 | Ponulak | G06N 3/049 700/253 |
| 2015/0142173 A1* | 5/2015 | Lewin | H04R 1/005 700/275 |
| 2015/0248279 A1* | 9/2015 | Auerbach | G06F 8/443 717/156 |
| 2015/0352718 A1* | 12/2015 | Lee | B25J 13/006 700/246 |
| 2016/0313725 A1 | 10/2016 | Yan et al. | |

FOREIGN PATENT DOCUMENTS

| | | |
|---|---|---|
| CN | 101226388 A | 7/2008 |
| CN | 201804248 U | 4/2011 |
| CN | 103048955 A | 4/2013 |
| CN | 103268083 A | 8/2013 |
| CN | 103744356 A | 4/2014 |
| JP | S 63285611 A | 11/1988 |
| WO | WO 01/01209 A1 | 1/2001 |
| WO | WO 2013/013580 A1 | 1/2013 |

OTHER PUBLICATIONS

Ma, Liang et al., Research and Design of Multi-axis CNC System Base on DSP, Micromotors, vol. 10, No. 45, Oct. 28, 2012.

Sun Daqun, Study and design of motion control system architecture based on ARM+FPGA, Dissertation Submitted to Hangzhou Dianzi University for the Degree of Master, Mar. 2013.

Zhu Gaofeng, Research on Embedded and Reconfigurable Numerical Control System, Dissertation Submitted to Guangdong University of Technology for the Degree of Master of Engineering, May 2007.

* cited by examiner

DYNAMICALLY CONFIGURABLE INTELLIGENT CONTROLLER AND CONTROL METHOD FOR MACHINE TOOLS BASED ON DSP/FPGA

CROSS REFERENCE TO RELATED APPLICATION

This application is a national stage of International Application PCT/CN2014/087239, filed on Sep. 24, 2014, which claims the benefit of Chinese Patent Application No. 2014100216414, filed on Jan. 17, 2014. The entireties of both applications are hereby incorporated by reference.

FIELD

The present disclosure relates generally to an improvement to intelligent control technique of machine tools, and more particularly, to a universal dynamically configurable intelligent controller of a machine tool based on DSP/FPGA and a control method thereof, which belongs to the mechanical manufacturing field.

BACKGROUND

Since it becomes increasingly difficult for the traditional machine tools to meet the needs of market, the computer numerical control (CNC) machine tools have progressively become the tendency of the development of high-end CNC machine tools. They have the intellectual features of higher processing quality and efficiency, stronger self-adaptation control, higher reliability, greater network integration ability, and better dynamic adaptability.

Intelligent control is a process for controlling a machine to perform a task assigned by human independently or by interacting with human, so as to automatically achieve its goals. When applying intelligent control in the machinery manufacturing, fuzzy mathematics, neural network or other methods are applied to build a dynamic environment model for the manufacturing process, and sensor integration technology is used for information processing and integration. This helps to solve the problems of hard-to-predict or impossible-to-predict circumstances relying on the incomplete or inaccurate data.

At present, there have been researches on the utilization of the intelligent control technique to achieve excellent and high-efficient processing of a machine tool. For example, in order to improve the machining efficiency and quality, the Chinese Patent No. CN 202448022U provides a honing machine with an intelligent control system including an automatic feeding device and an on-line measurement device, which can dynamically display machining states and automatically compensate and correct dynamic error caused by various interferences by the configuration of a pressure/grating sensor and the connection with a microcontroller. The Chinese Patent No. CN 1349877A/CN 1128040C provides an intelligent cutter bar having dynamic characteristics of the electro-rheological material, which can be on-line adjusted quickly. The cutter bar can quickly predict the chattering in cutting based on a cutting vibration signal, and timely adjust the dynamic characteristics of the cutting system on-line based on the information contained in an acceleration signal. As another example, for energy-saving control, the Patent No. JP 5083476 B1 has disclosed a numerical control apparatus adapted to control the energy consumption of peripherals of the machine tool, in which a power consumption calculating unit is configured to calculate power consumption of the peripherals of the machine tool, and a state monitoring unit is configured to monitor control signals of the input and output of the PLC of the machine tool to turn off the peripherals. The U.S. Pat. No. 8,362,655 B2 provides a method for reducing the energy consumption of a machine, and an apparatus for reducing the energy consumption of a machine based on the method, which includes a deactivation device and a monitoring device. The deactivation device is predefined with a deactivation rule, which emits deactivation signals in response to a corresponding deactivation event generated by the machine, and the machine will be controlled to switch to an energy-saving mode once the monitoring device detects the deactivation signal.

Thus, it can be seen that the above patents mainly focus on the optimization of individual components of the machine tool and the transformation of control ways. However, the machine tools differ from each other, and their internal structures and input-output interfaces are not the same. In addition, the task performed by the machine tool varies according to the performance and processing technology of the machine tool. Thus, the above existing devices or systems cannot meet the needs of application extension.

SUMMARY

In view of the above, in order to overcome the problem that the prior art cannot meet the needs of generality, dynamics and configurability of the controller during the operational process of the machine tool, an object of the present disclosure is to provide a dynamically configurable intelligent controller of a machine tool based on DSP/FPGA and control method thereof.

According to one aspect of the present disclosure, a dynamically configurable intelligent controller of a machine tool based on DSP/FPGA includes a DSP/FPGA information processing module, a data input module, an output execution module and an embedded central processing system module; the DSP/FPGA information processing module includes a hardware reconfigurable information sampling unit, a digital signal processing unit, a hardware reconfigurable algorithm unit, a hardware reconfigurable control information output execution unit and a data storage unit; the data input module provides a data input interface, and is coupled to the DSP/FPGA information processing module via the hardware reconfigurable information sampling unit for processing acquired digital signals or analog signals and sending a digital signal stream to the DSP/FPGA information processing module;

The hardware reconfigurable control information output execution unit is configured to be coupled with the output execution module and provide control instructions to the output execution module;

The output execution module is configured to be coupled with a control actuator of the machine tool, and output and execute an intelligent control instruction;

The central processing embedded system module is configured to be coupled with the DSP/FPGA information processing module, and dynamically exchange data information and instructions; when sending an intelligent control strategy file generated based on intelligent control needs to the DSP/FPGA information processing module, a dynamic combination of a hardware information sampling unit, a hardware algorithm unit and a hardware information output execution unit for meeting the intelligent control needs is formed by reconfiguring the hardware reconfigurable information sampling unit, the hardware reconfigurable algorithm unit and the hardware reconfigurable control information output execution unit, and an intelligent control algorithm graph is automatically generated, based on the intelligent control strategy file; and during the intelligent control, the reconfiguration information sampling unit is configured to acquire a current state information of the machine tools, fuse the current state information with historical state information to re-analyze the intelligent control algorithm graph, generate an intelligent control instruction, and output the intelligent control command to the output execution module via the hardware information output execution unit.

The intelligent controller is configured to control the machine tool's running, wherein the data input module includes a digital signal isolation circuit, a program signal conditioning array, an analog signal isolation circuit and an A/D conversion array; the digital signal isolation circuit is configure to receive digital signals from an NC system and a PLC system of the machine tool and is coupled directly to the hardware reconfigurable information sampling unit; the program signal conditioning array is configured to receive analog signals from a sensor of the machine tool, and is coupled sequentially to the analog signal isolation circuit and the A/D conversion array; and an output of the A/D conversion array is coupled to the hardware reconfigurable information sampling unit, and the A/D) conversion array is configured be controlled by the hardware reconfigurable information sampling unit to accurately sample multichannel analog signals in real time at a high speed, and convert the analog signals into a digital signal stream with high accuracy, high speed and low phase jitter.

The intelligent controller is configured to control the machine tool's running, wherein the output execution module includes an output isolation circuit, a weak signal output execution module, a strong signal output execution module and an analog output execution module, a signal from the hardware reconfigurable control information output execution unit is output to the output isolation circuit, the output isolation circuit outputs the signal to the weak signal output execution module, the strong signal output execution module or the analog output execution module according to the characteristic of the signal, and the weak signal output execution module, the strong signal output execution module or the analog output execution module outputs the signal to the control actuator of the machine tool.

The intelligent controller is configured to control the machine tool's running, wherein the central processing embedded system module includes an embedded central processing unit, a memory, a LAN interface, a wireless communication interface and a USB interface; the LAN interface, the wireless communication interface and the USB interface communicate with an external server system and/or other intelligent equipment by a wired/wireless communication mode, and are configured to receive an external input instruction and transmit the external input instruction to the embedded central processing unit; and the embedded central processing unit is connected with the DSP/FPGA information processing module via a high-speed communications interface for dynamically exchanging data information and instructions.

According to another aspect of the present disclosure, a dynamically configurable intelligent control method of a machine tool based on DSP/FPGA is provided, which includes:
  a) creating, by an embedded central processing system module, a strategy file and loading it into a DSP/FPGA information processing module, according to intelligent control needs of the machine tool;
  b) parsing, by the DSP/FPGA information processing module, configuration information of reconfiguration of input and output interfaces, configuration information of an algorithm module and configuration information of an algorithm graph included in the strategy file, and reconfiguring input and output hardware units and a DSP algorithm hardware unit according to the above parsed information;
  c) coupling the reconfigured input and output hardware units and DSP algorithm hardware unit, and generating an intelligent control algorithm graph according to the configuration information of the algorithm graph;
  d) obtaining state information of the machine tool, acquiring a current state information of the machine tool, and analyzing the intelligent control algorithm graph to obtain an intelligent control instruction, according to the current state information and historical state information; and
  e) transmitting, by the reconfigured output hardware unit, the intelligent control instruction to an output execution module, and outputting, by the output execution module, a control instruction to a control actuator of the machine tool for executing.

According to the intelligent control strategy file formed based on the intelligent control needs, the DSP/FPGA information processing module reconfigures and generates a hardware information sampling unit, a hardware information output execution unit and a hardware algorithm unit, to perform a configuration of hardware units, and generates the intelligent control algorithm graph. During the intelligent control, the historical state information, the current state information and the intelligent control algorithm graph are analyzed to generate an intelligent control instruction and execute the same.

Compared with the prior art, the present disclosure has the advantages as below.

1) The intelligent controller according to the present disclosure can dynamically configure the input and output hardware and the algorithm hard ware, and reconfigure the I/O connection and the algorithm module, to generate an intelligent control algorithm graph.

2) The intelligent controller according to the present disclosure can analyze the intelligent control algorithm graph and dynamically output control instructions, according to the detected real-time conditions of the machine tool.

3) With the present disclosure, intelligent control of machining process of the machine tool, intelligent control of machining quality/efficiency of the machine tool, and intelligent control of energy efficiency of the machine tool can be integrated to share data, hardware or algorithm.

DETAILED DESCRIPTION OF THE PREFERRED EMBODIMENTS

Figure 1:
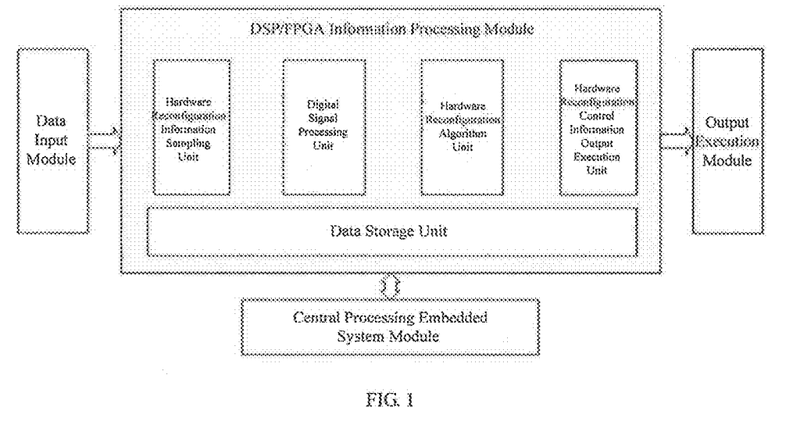
FIG. 1 is a schematic diagram illustrating a dynamically configurable intelligent controller of a machine tool based on DSP/FPGA according to one embodiment of the present disclosure.

As show in FIG. 1, a dynamically configurable intelligent controller of a machine tool based on DSP/FPGA includes a DSP/FPGA information processing module, a data input module, an output execution module and an embedded central processing system module. The DSP/FPGA information processing module includes a hardware reconfigurable information sampling unit, a digital signal processing unit, a hardware reconfigurable algorithm unit, a hardware reconfigurable control information output execution unit and a data storage unit. The data input module is configured to provide a data input interface coupled to the DSP/FPGA information processing module via the hardware reconfigurable information sampling unit and pre-process the acquired digital signals or analog signals (from the data input module coupled with a sensing device of the machine tool) to digital signal stream, which will be sent to the DSP/FPGA information processing module.

Based on different modes of sampling, quantizing and coding provided by the data input module, the hardware reconfigurable information sampling unit may reconfigure and select a hardware unit that matches signal characteristics, to receive and process data information to ensure the integrity and accuracy of the information while efficiently making use of the resources of the sampling hardware. The digital signal processing unit may transform information with different modes of sampling, quantizing and coding into a uniform digital signal format, for information fusion and support the needed complicated algorithm. The hardware reconfigurable algorithm unit can implement complicated logic calculations by dynamic configuration of a programmable gate array. The hardware reconfiguration is mainly embodied as that a plurality of intelligent algorithms can be automatically implemented, and when a new intelligent control is added or the intelligent control could not achieve the desired results, the hardware reconfiguration is mainly embodied as that available hardware resources are automatically found to implement intelligent operating function. The hardware reconfigurable control information output execution unit may translate the standard information calculated by the intelligent processing module into digital signals of different quantization and encodings required by output execution modules, and reconfigure or select a hardware unit that matches signal characteristics and send the control information to each output execution module.

The DSP/FPGA information processing module may be connected to the output execution module via the hardware reconfigurable control information output execution unit to provide executable instructions to output execution modules.

The output execution module may be connected with the actuators of the machine tool and output or execute an intelligent control instruction. The control instructions are sent to control the machine tool to execute corresponding operations.

The embedded central processing system module has integrated with communication interfaces which can be configured to communicate with other devices or systems. The central processing embedded system module is coupled with the DSP/FPGA information processing module, and the embedded central processing system dynamically exchanges data information and instructions with the DSP/FPGA information processing module, and an intelligent control strategy file formed based on intelligent control needs to the DSP/FPGA information processing module, in order to manage the operation of the whole system. A dynamic combination of a hardware information sampling unit, a hardware algorithm unit and a hardware information output execution unit for meeting the intelligent control needs is reconfigured and generated by the hardware reconfigurable information sampling unit, the hardware reconfigurable algorithm unit and the hardware reconfigurable control information output execution unit, and an intelligent control algorithm graph is automatically generated, based on the intelligent control strategy file. During the intelligent control, an intelligent control instruction is generated based on the historical state of the machine tool, the current state of the machine tool and the analyzed algorithm graph, and output to the output execution module via the reconfigured and generated hardware information output execution unit.

Figure 2:
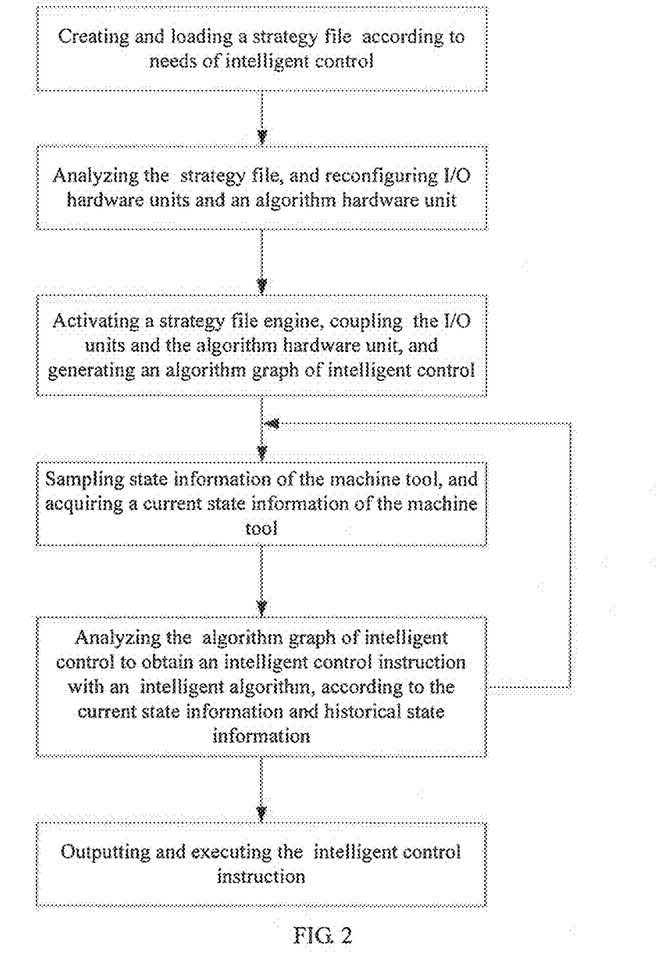
FIG. 2 is a flow diagram flow diagram illustrating a dynamically configurable intelligent control method of a machine tool based on DSP/FPGA according to one embodiment of the present disclosure.

The working principle and process of the intelligent controller consisting of the above hardware are as follows:

a) creating, by an embedded central processing system module, a strategy file and loading it into a DSP/FPGA information processing module, according to intelligent control needs of the machine tool;

b) parsing, by the DSP/FPGA information processing module, configuration information of reconfiguration of input and output interfaces, configuration information of an algorithm module and configuration information of an algorithm graph included in the strategy file, and reconfiguring input and output hardware units and a DSP algorithm hardware unit according to the above parsed information;

c) coupling the reconfigured input and output hardware units and DSP algorithm hardware unit, and generating an intelligent control algorithm graph according to the configuration information of the algorithm graph;

d) obtaining the state information of the machine tool with the support of a strategy file engine, acquiring a current state information of the machine tool, and analyzing the intelligent control algorithm graph to obtain an intelligent control instruction, according to the current state information and historical state information; and e) transmitting, by the reconfigured output hardware unit, the intelligent control instruction to an output execution module, and outputting, by the output execution module, a control instruction to a control actuator of the machine tool for executing.

The above control flow is as shown in FIG. 2.

With reference to the following examples focusing on energy-saving control for the CNC machine tools, the present disclosure will be further illustrated.

Figure 3:
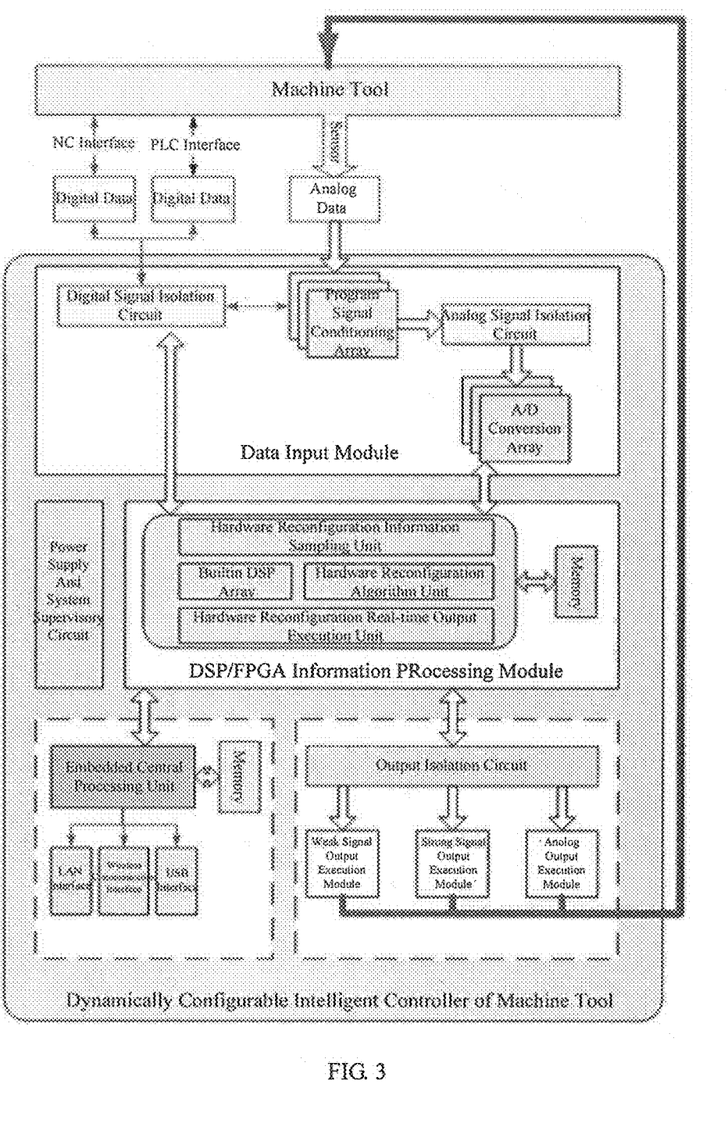
FIG. 3 is a schematic diagram illustrating hardware structure of a dynamically configurable energy-saving control system of a machine tool based on DSP/FPGA according to one embodiment of the present disclosure.

As shown in FIG. 3, an energy-saving controller for the CNC machine tools includes a data input module, a DSP/FPGA information processing module, an output execution module, an embedded central processing system module, and a power supply and system supervisory circuit.

The data input module includes a digital signal isolation circuit, a program signal conditioning array, an analog signal isolation circuit and an A/D conversion array, etc. The data input module may acquire various information from a NC system (via a NC interface), a PLC system (via a PLC interface) or a sensor of a machining device (machine tool), in which the signal form INC interfaces and the PLC interfaces is digital while from the sensors is analog. The analog signals from the sensor are preprocessed by the program signal conditioning array and isolated by the analog signal isolation circuit in sequence, and then transmitted into the A/D conversion array. The A/D conversion array is configured to accurately sample analog signals in real time at a high speed, under control of the hardware reconfiguration synchronization sampling array in the DSP/FPGA information processing module, and convert the analog signals into a digital signal stream with high accuracy, high speed and low phase jitter. Digital signals from the NC system and the PLC system directly passes into the hardware reconfiguration synchronization sampling array in the DSP/FPGA information processing module via the digital signal isolation circuit.

The DSP/FPGA information processing module includes a hardware reconfiguration synchronization sampling array (i.e., hardware reconfigurable information sampling unit in FIG. 1), a DSP array (i.e., digital signal processing unit in FIG. 1), a hardware reconfigurable algorithm unit, a hardware reconfiguration real-time output execution array (i.e., hardware reconfigurable control information output execution unit in FIG. 1) and storage. The module implements the following processing.

a) As to data acquisition, the data may be obtained from a sampling array of a sensor, or communication with the NC/PLC, or may be effective signals from other approaches. All of these real-time raw data may be encapsulated uniformly, each data may be tagged with time-stamp, source-stamp, characteristics-stamp or others and stored in memory according to a unified defined format, and all of the data may be sorted by time by hardware and wait for being sent to a DSP/FPGA algorithm array (in this case, it refers to the hardware reconfigurable algorithm unit) for processing.

b) After the real-time data stream being processed by the DSP/FPGA algorithm array, the status of the machine tool may be obtained by analyzing the real-time data stream according to needs of the strategy.

c) A real-time output instruction will be generated by an embedded strategy execution engine, based on the real-time state of the machine tool, various setting conditions, logical relations and a high-level logic strategy. The execution strategy portion of the real-time output instruction may be decomposed into a real-time DSP/FPGA algorithm and module setting parameters, which may be executed by the hardware reconfiguration real-time output execution array in the DSP/FPGA information processing module. The hardware reconfiguration real-time output execution array may translate the actual output requirement into various output forms, such as PWM square wave, varying frequency and amplitude sinusoidal signal, direct current open-loop or closed-loop output, pulse signal, control instruction of electrical switches, PLC/NC execution instruction, required by the actual system, which may be transmitted to the output isolation circuit in the output execution module.

The output execution module includes an output isolation circuit, a weak signal output execution module, strong signal output execution module and an analog output execution module. The signal output from the hardware reconfiguration real-time output execution array may pass through the output isolation circuit to the weak signal output execution module, the strong signal output execution module or the analog output execution module, and the weak signal output execution module, the strong signal output execution module or the analog output execution module may output the signal to an execution unit of the machine tool for controlling the power-saving of the machine tool.

The embedded central processing system module includes an embedded central processing unit, a storage, a LAN interface, a wireless communication interface and a USB interface; the LAN interface, the wireless communication interface and the USB interface communicate with an external server system and/or other intelligent equipment by a wired/wireless communication mode for receiving an external input instruction and transmitting the external input instruction to the embedded central processing unit; and the embedded central processing unit is coupled with the DSP/FPGA information processing module via a high-speed communications interface for dynamically exchanging data information and instructions and managing the operation of the whole system.

The power source and system supervisory circuit are configured to supply power to the energy-saving controller and to monitor the software program (for example, a watchdog circuit).

Figure 4:
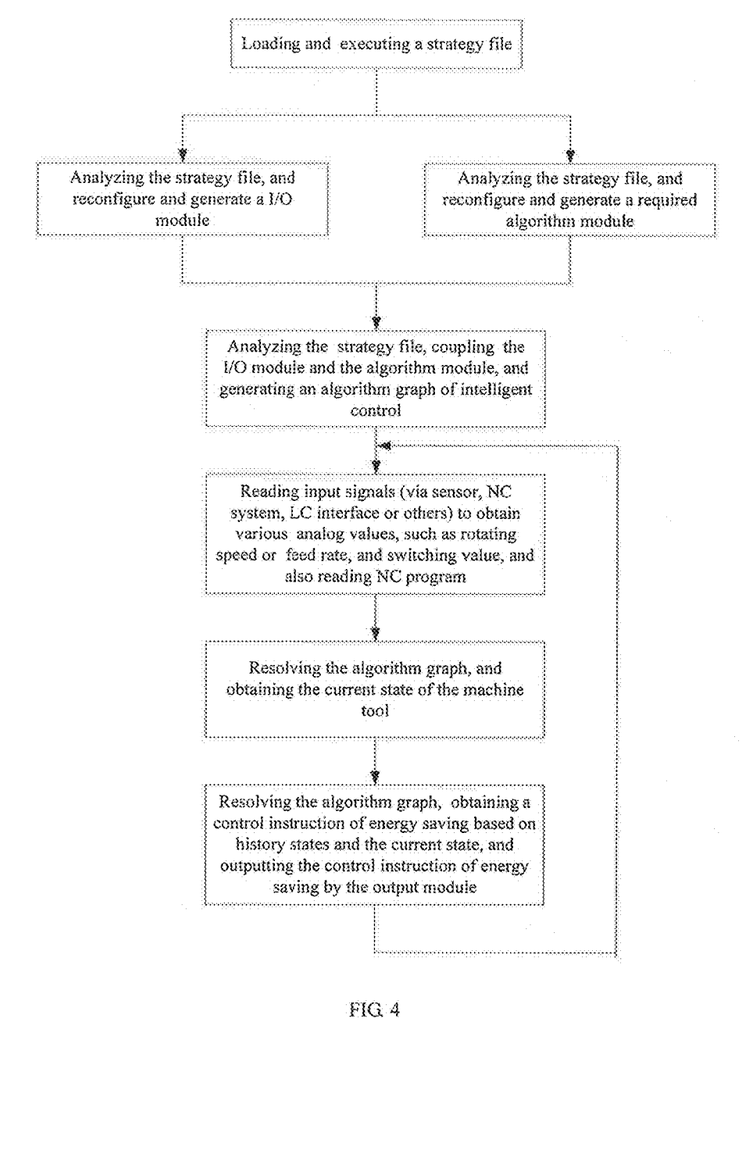
FIG. 4 is a flow diagram flow diagram illustrating a dynamically configurable energy-saving control method of a machine tool based on DSP/FPGA according to one embodiment of the present disclosure.

Firstly, based on the configuration information of reconfiguration of input and output (I/O) interface, configuration information of an algorithm module and configuration information of an energy-saving algorithm graph included in the strategy file, the embedded strategy execution engine structured in the operating system may reconfigure part of input and output interfaces and the DSP algorithm module of the energy-saving controller, and reconfigure the connection between the I/O and the algorithm module to generate an algorithm graph of energy-saving control. Then, with support of the strategy execution engine, input signals acquired from the machine tool that actually execute the machining task may be read (via a sensor, a NC system or a LC interface) to obtain various analog values, such as rotating speed or feed rate, and switching value, and NC program may also be read. The current state of the machine tool may be obtained by resolving the algorithm graph. A control instruction of energy saving may be obtained based on the history states and the current state. Finally, the control instruction of energy saving may be output by the output execution module, as shown in FIG. 4.

Because of the above features, the energy-saving controller may describe a control strategy with a high level description language for different devices. After being analyzed by the execution engine, the description language may be resolved as a DSP/FPGA algorithm or a program that can be directly executed by the execution engine, based on needs of execution performance and function, so that an efficient integration of generalization and flexibility can be resolved at large.

In addition, the strategy may be written by a high level description language for the engine, and each configuration or execution statement of the description language corresponds to one or more complicated underlying functions implemented by hardware or software, which may include how to process input signals, what type of algorithm graph is built and which kind of standard output module is used by each kind of output signal. In this way, the control strategy of different devices may be described by few high level description codes, without regard to the implement of the underlying code, so the implement of the underlying platform (virtual machine) and the high level strategy may be fully separated to achieve the highest degree of reuse, and the energy-saving controller may be used in a wide variety of manufacturing equipments.

Figure 5:
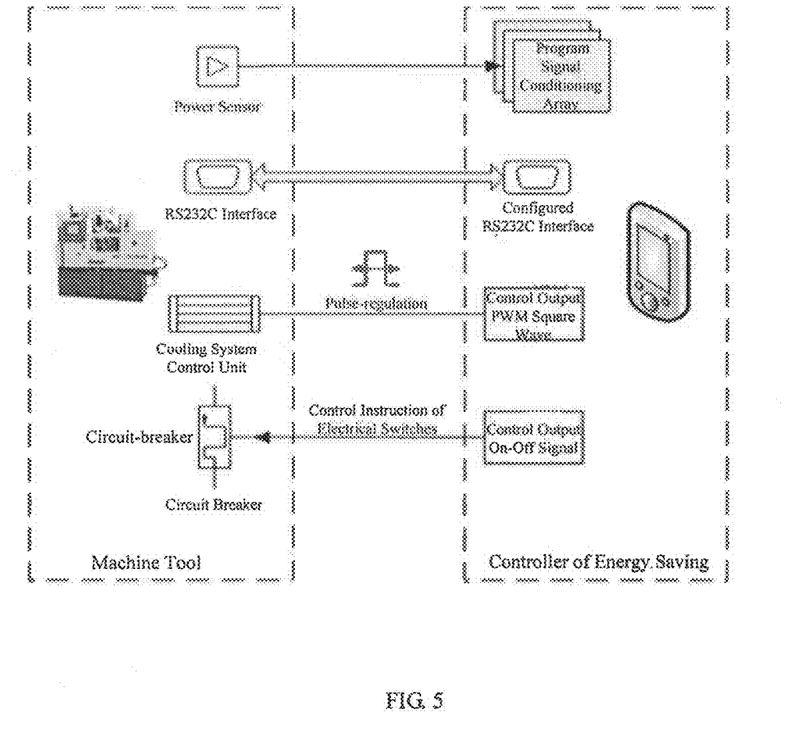
FIG. 5 is a schematic diagram illustrating an application of a dynamically configurable energy-saving control system of a machine tool based on DSP/FPGA according to one embodiment of the present disclosure.

FIG. 5 is a schematic diagram illustrating an application of an energy-saving control system of a dynamically configurable machine tool based on DSP/FPGA according to one embodiment of the present disclosure. Signals from a sensor is input to the program signal conditioning array of the energy-saving controller, and are processed by the energy-saving, controller. The state information of NC system and PLC within the machine tool may pass into the energy-saving controller via a RS232C serial port. The energy-saving controller may output a PWM square wave and control instruction of electrical switches via the circuit of output control unit control the on-off of the power supply of the control unit and the energy-consuming unit of the machine tool.

The energy-saving controller may use a high-performance Xilinx Zynq 7020 FPGA chip as an underlying processing platform. The chip is the first product integrated with a high performance embedded processor and a large scale integration of DSP/FPGA resources. The chip includes an embedded processor portion and a DSP/FPGA portion. The embedded processor is a dual-core Cotex-A9 ARM processor with a running frequency up to 1 GHz, which has a strong processing performance and rich peripherals. The DSP/FPGA portion uses the latest 7th generation FPGA technology of Xilinx, which has a high performance, up to 220 built-in parallel DSP processing units the peak processing capacity of which can be up to 276 GMACs, and can be configured to realize various complex algorithms. In addition, the FPGA also supports the reconfiguration of units when running, to support dynamically modifying of hardware algorithm when running, so the hardware reconfiguration of the algorithm module and the input/output processing unit can be supported. The ARM processor is coupled to the DSP/FPGA portion with internal dozens of 32-bit or 64-bit AXI buses, in which the total bandwidth may be up to hundreds of gigabits per second. The FPGA is the 7th generation Artix structure FPGS, in which the number of equivalent gates is up to eighty-five thousands.

Based on this chip, the central processing embedded system portion and the DSP/FPGA portion in the structure of the above device are directly implemented in one single chip in actual implementation. In this way, the design of the system is simplified, and the system has great performance advantage compared with an implementation of two separate systems.

The software platform of the central processing embedded system portion uses an embedded Linux system as its operating system, and the real-time characteristic of the Linux kernel may be optimized in a real implementation to meet the requirement of the real-time scheduling of the system. The strategy execution engine includes a kernel component and an application layer component. The underlying part (virtual machine component) that communicates with the DSP/FPGA directly can be implemented in the operating system kernel directly, and the high-level strategy language parsing and executing part can run in the application layer as application software. The underlying part and the high-level strategy language parsing and executing part may communicate with each other by system calls.

The DSP/FPGA hardware reconfigurable input/output and algorithm portion may be designed as individual firmware modules which may be written into specified locations of the hardware by Linux system calls, so as to initiate corresponding algorithm functions.

The central processing embedded system portion and the DSP/FPGA algorithm processing portion may communicate with each other via high speed AXI buses, and the operation of the whole system may be scheduled by the embedded Linux operating system under unified management.

The above embodiments are chosen and described in order to explain the principles of the disclosure and their practical application so as to activate others skilled in the art to utilize the disclosure. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A configurable controller of a machine tool based on at least one of a digital signal processor (DSP) or a field programmable gate array (FPGA), comprising:
    an information processing module implemented by the at least one of the DSP or the FPGA,
    a data input module,
    an output execution module and
    an embedded central processing system module,
    wherein the information processing module comprises a reconfigurable information sampling unit implemented by hardware, a digital signal processing unit, a reconfigurable algorithm unit implemented by hardware, a reconfigurable control information output execution unit implemented by hardware, and a data storage unit;
    the data input module is configured to provide a data input interface coupled to the information processing module via the reconfigurable information sampling unit for processing acquired digital signals or analog signals, and sending a digital signal stream to the information processing module;
    the reconfigurable control information output execution unit is configured to be coupled with the output execution module and to provide control instructions to the output execution module;
    the output execution module is configured to be coupled with a control actuator of the machine tool to output and execute a control instruction;
    the central processing embedded system module is configured to be coupled with the information processing module to exchange data information and instructions;
    when sending a control strategy file created based on control needs to the information processing module, based on the control strategy file, a combination of a hardware information sampling unit, a hardware algorithm unit and a hardware information output execution unit for meeting the control needs is reconfigured and generated by the reconfigurable information sampling unit, the reconfigurable algorithm unit and the reconfigurable control information output execution unit, and a control algorithm is automatically generated; and during the control, the reconfiguration information sampling unit is configured to acquire current state information of the machine tool, fuse the current state information with historical state information to analyze the control algorithm, generate a control instruction, and output the control instruction to the output execution module via the reconfigured and generated hardware information output execution unit.

2. The controller of claim 1, wherein the controller is configured to control the machine tool's running, the data input module comprising a digital signal isolation circuit, a program signal conditioning array, an analog signal isolation circuit and an Analog-to-Digital (A/D) conversion array; the digital signal isolation circuit is configured to receive digital signals from a numerical control (NC) system and a programmable logic controller (PLC) system of the machine tool and is coupled directly to the reconfigurable information sampling unit; the program signal conditioning array is configured to receive analog signals from a sensor of the machine tool, and is coupled with the analog signal isolation circuit and the A/D conversion array sequentially; and an output of the A/D conversion array is coupled to the reconfigurable information sampling unit, and the A/D conversion array is controlled by the reconfigurable information sampling unit to accurately sample multichannel analog signals in real time at a high speed, and convert the analog signals into a digital signal stream with high accuracy, high speed and low phase jitter.

3. The controller of claim 2, wherein the controller is configured to control the machine tool's running, the output execution module comprising an output isolation circuit, a first signal output execution module, a second signal output execution module and an analog output execution module, a signal from the reconfigurable control information output execution unit is input to the output isolation circuit, the output isolation circuit outputs the signal to the first signal output execution module, the second signal output execution module or the analog output execution module according to the characteristic of the signal, and the first signal output execution module, the second signal output execution module or the analog output execution module outputs the signal to the control actuator of the machine tool.

4. The controller of claim 2, wherein the controller is configured to control the machine tool's running, the central processing embedded system module comprising an embedded central processing unit, a memory, a local area network (LAN) interface, a wireless communication interface and a universal serial bus (USB) interface; the LAN interface, the wireless communication interface and the USB interface communicate with an external server system and/or other equipment by a wired/wireless communication mode, and are configured to receive an external input instruction and transmit the external input instruction to the embedded central processing unit; and the embedded central processing unit is coupled with the information processing module via a high-speed communications interface for exchanging data information and instructions.

* * * * *